US011544463B2

(12) United States Patent
Georges et al.

(10) Patent No.: US 11,544,463 B2
(45) Date of Patent: Jan. 3, 2023

(54) TIME ASYNCHRONOUS SPOKEN INTENT DETECTION

(71) Applicant: Intel Corporation, Santa Clara, CA (US)

(72) Inventors: Munir Georges, Kehl (DE); Wenda Chen, Singapore (SG); Tobias Bocklet, Munich (DE); Jonathan Huang, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 433 days.

(21) Appl. No.: 16/407,766

(22) Filed: May 9, 2019

(65) Prior Publication Data

US 2019/0266240 A1 Aug. 29, 2019

(51) Int. Cl.
*G06F 40/289* (2020.01)
*G10L 15/16* (2006.01)
*G10L 15/14* (2006.01)
*G06N 3/04* (2006.01)
*G06N 20/20* (2019.01)
*G06F 17/18* (2006.01)
*G06N 3/08* (2006.01)
*G10L 15/08* (2006.01)

(52) U.S. Cl.
CPC ............ *G06F 40/289* (2020.01); *G06F 17/18* (2013.01); *G06N 3/0454* (2013.01); *G06N 3/08* (2013.01); *G06N 20/20* (2019.01); *G10L 15/142* (2013.01); *G10L 15/16* (2013.01); *G10L 2015/088* (2013.01)

(58) Field of Classification Search
CPC ..... G06F 40/289; G06F 17/18; G06N 3/0454; G06N 3/08; G06N 20/20; G06N 3/0445; G06N 7/005; G10L 15/142; G10L 15/16; G10L 2015/088; G10L 15/1822; G10L 15/22
See application file for complete search history.

(56) References Cited

U.S. PATENT DOCUMENTS

| 10,097,919 | B2 | 10/2018 | Jarvis et al. | |
|---|---|---|---|---|
| 10,482,904 | B1* | 11/2019 | Hardie | G10L 15/22 |
| 10,847,149 | B1* | 11/2020 | Mok | G10L 15/08 |
| 11,024,316 | B1* | 6/2021 | Fu | G10L 15/04 |
| 2011/0093263 | A1* | 4/2011 | Mowzoon | G10L 15/26 704/235 |

(Continued)

FOREIGN PATENT DOCUMENTS

| CN | 109076284 | 12/2018 |
|---|---|---|
| WO | 2017218243 | 12/2017 |

OTHER PUBLICATIONS

GLoVe: Global Vectors for Word Representation; available online via: https://nlp.stanford.edu/projects/glove; accessed Mar. 27, 2019.

(Continued)

*Primary Examiner* — Daniel C Washburn
*Assistant Examiner* — Athar N Pasha
(74) *Attorney, Agent, or Firm* — Essential Patents Group, LLP.

(57) ABSTRACT

An embodiment of a spoken intent detection device includes technology to detect a phrase in an electronic representation of an audio stream based on a pre-defined vocabulary, associate a time stamp with the detected phrase, and classify a spoken intent based on a sequence of detected phrases and the respective associated time stamps. Other embodiments are disclosed and claimed.

21 Claims, 10 Drawing Sheets

(56) References Cited

U.S. PATENT DOCUMENTS

| | | | |
|---|---|---|---|
| 2014/0146644 A1* | 5/2014 | Chen | G08C 17/02 367/197 |
| 2015/0095027 A1 | 4/2015 | Parada San Martin et al. | |
| 2018/0075847 A1* | 3/2018 | Lee | G06F 16/24522 |
| 2018/0338041 A1* | 11/2018 | McGann | G06N 7/005 |
| 2019/0102145 A1 | 4/2019 | Wilberding et al. | |
| 2019/0251425 A1* | 8/2019 | Jaffari | G06F 17/16 |
| 2019/0378006 A1* | 12/2019 | Fukuda | G06K 9/6293 |
| 2020/0089757 A1* | 3/2020 | Machado | G06F 40/30 |
| 2020/0143114 A1* | 5/2020 | Dua | G06N 20/00 |

OTHER PUBLICATIONS

PHOIBLE 2.0; Moran, Steven & McCloy, Daniel (eds.) 2019; Jena: Max Planck Institute for Science of Human History (available online at http://phoible.org, accessed on Mar. 27, 2019).

Al-Hashemi, R, "Text summarization extraction system (tses) using extracted keywords", Int. Arab J. e-Technol., vol. 1, No. 4, pp. 164-168, 2010.

Chung, et al., "Speech2vec: A sequence-to-sequence framework for learning word embeddings from speech", CoRR, vol. abs/1803.08976, 2018.

Mandal, A. et al., "Recent developments in spoken term detection: a survey", International Journal of Speech Technology, vol. 17, No. 2, pp. 183-198, 2014.

Sherry, J. et al., "Getting things done in an autonomous vehicle", Workshop at the 13th Annual ACM/IEEE International Conference on Human-Robot Interaction (HRI), 2018.

Tur, G. et al., "Intent determination and spoken utterance classification", Spoken Language Understanding: Systems for Extracting Semantic Information from Speech; pp. 93-118, 2011.

U.S. Appl. No. 16/366,757, filed Mar. 27, 2019.

European Search Report for EP Patent Application No. 20165342.5 dated Oct. 22, 2020.

Pan, Lingfeng et al., "A Multiple Utterance based Neural Network Model for Joint Intent Detection and Slot Filling", CCKS Tasks 2018, Aug. 17, 2018.

Office Action for European Patent Application No. 16/407,766, dated Oct. 11, 2022.

\* cited by examiner

(12) United States Patent

TIME ASYNCHRONOUS SPOKEN INTENT DETECTION

BACKGROUND

Automatic speech recognition (ASR) systems may be found in many devices and environments including home, work, and vehicles. Some ASR systems include wake on keyphrase technology. For example, AMAZON products may utilize the phrase "ALEXA," GOOGLE products may utilize the phrase "OK, GOOGLE," APPLE products may utilize the phrase "HEY SIRI." A suitably configured device in the local environment may listen for the keyphrase and when the keyphrase is detected the spoken request may be sent along for further processing.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
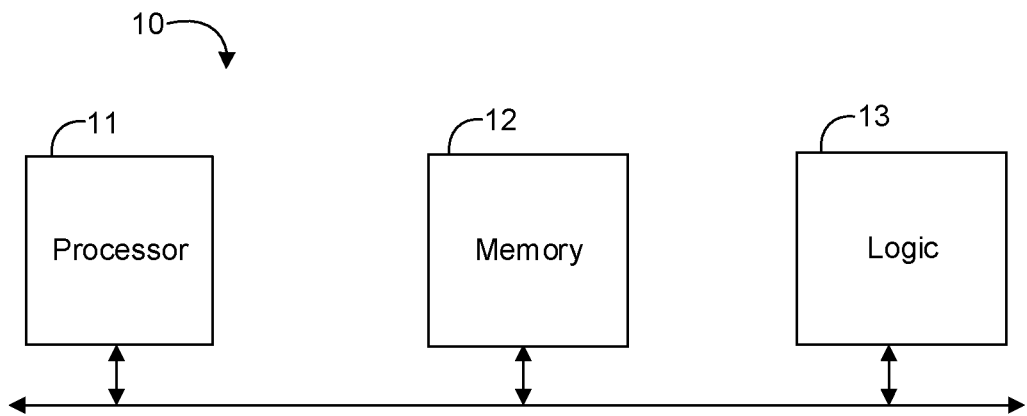
FIG. 1 is a block diagram of an example of an electronic system according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, systems, and articles are described herein related to speech recognition systems. More particularly, some embodiments relate to time asynchronous spoken intent detection.

With reference to FIG. 1, an embodiment of an electronic system 10 may include memory 12 to store an electronic representation of an audio stream, a processor 11 coupled to the memory 12, and logic 13 coupled to the processor 11 and the memory 12. The logic 13 may be configured to detect a phrase in the audio stream based on a pre-defined vocabulary, associate a time stamp with the detected phrase, and classify a spoken intent based on a sequence of detected phrases and the respective associated time stamps. For example, the logic 13 may be further configured to monitor a continuous audio stream, detect the phrase in the continuous audio stream, and compute a quantized time stamp for the detected phrase which is relative to previously detected phrase. In some embodiments, the logic 13 may include a first neural network with an acoustic model and a hidden Markov model (HMM) to detect the phrase in the audio stream. For example, the acoustic model may be configured to automatically add time stamp information to text data for the detected phrase.

In some embodiments, the logic 13 may additionally, or alternatively, include a second neural network trained to return a probability for each of two or more intent classifications based on detected phrases and time stamps as input features to the second neural network. For example, the logic 13 may be further configured to classify the spoken intent in accordance with a highest probability of the two or more intent classifications. In some embodiments, the logic 13 may be configured to asynchronously trigger the second neural network when a sequence of detected phrases is ready for classification.

Embodiments of each of the above processor 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the processor 11 may include a general purpose processor, a special purpose processor, a central processor unit (CPU), a graphic processor, a controller, a micro-controller, etc.

In some embodiments, the memory 12, and/or the logic 13, may be located in, or co-located with, various components, including the processor 11 (e.g., on a same die). For example, the logic 13 may be implemented on a semiconductor apparatus which may include one or more substrates, with the logic 13 coupled to the one or more substrates. In some embodiments, the logic 13 may be at least partly implemented in one or more of configurable logic and fixed-functionality hardware logic on semiconductor substrate(s) (e.g., silicon, sapphire, gallium-arsenide, etc.). For example, the logic 13 may include a transistor array and/or other integrated circuit components coupled to the substrate(s) with transistor channel regions that are positioned within the substrate(s). The interface between the logic 13 and the substrate(s) may not be an abrupt junction. The logic 13 may also be considered to include an epitaxial layer that is grown on an initial wafer of the substrate(s).

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C#or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, detecting the phrase in the audio stream, associating the time stamp with the detected phrase, classifying the spoken intent, etc.).

Figure 2A:
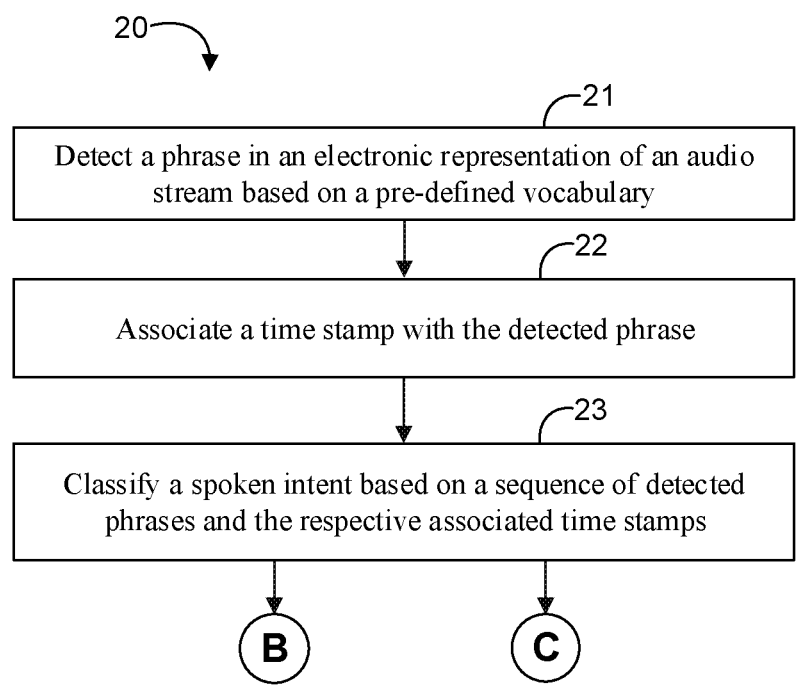
FIGS. 2A to 2C are flowcharts of an example of a method of detecting spoken intent according to an embodiment.
Figure 2B:
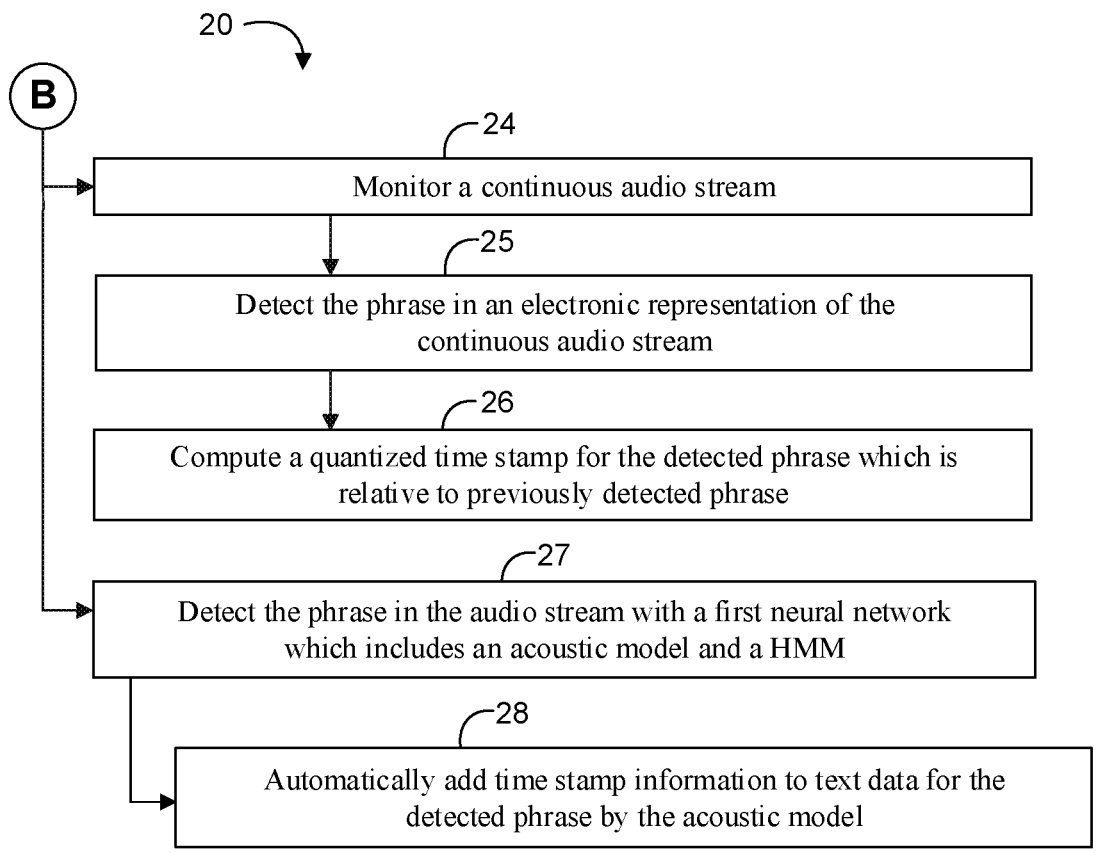
Figure 2C:
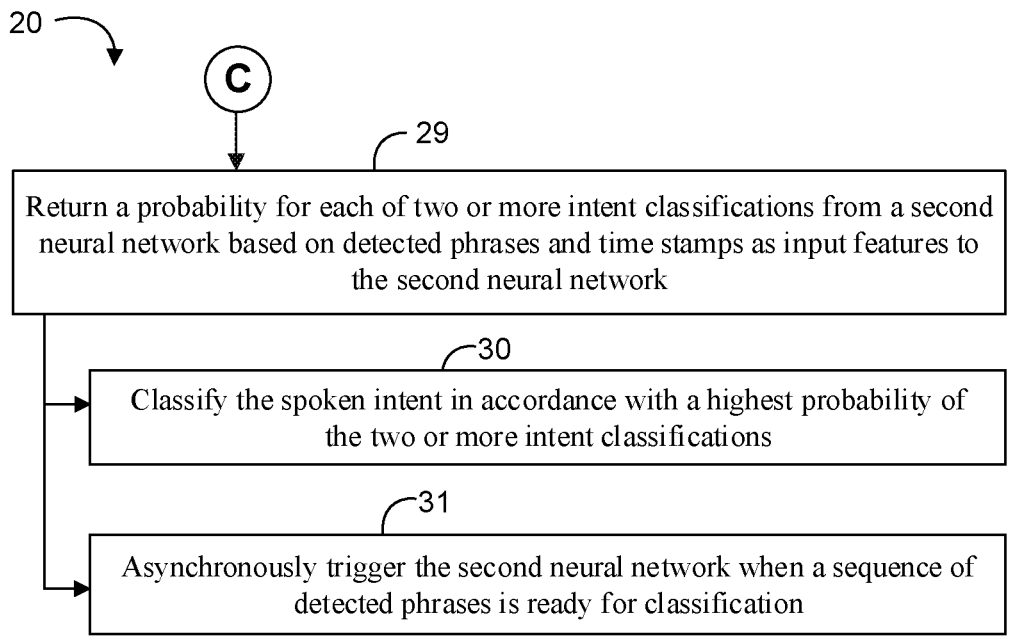

Turning now to FIGS. 2A to 2C, an embodiment of a method 20 of detecting spoken intent may include detecting a phrase in an electronic representation of an audio stream based on a pre-defined vocabulary at block 21, associating a time stamp with the detected phrase at block 22, and classifying a spoken intent based on a sequence of detected phrases and the respective associated time stamps at block 23. For example, the method 20 may include monitoring a continuous audio stream at block 24, detecting the phrase in an electronic representation of the continuous audio stream at block 25, and computing a quantized time stamp for the detected phrase which is relative to previously detected phrase at block 26. Some embodiments of the method 20 may include detecting the phrase in the audio stream with a first neural network which includes an acoustic model and a HMM at block 27. For example, the method 20 may include automatically adding time stamp information to text data for the detected phrase by the acoustic model at block 28.

Some embodiments of the method 20 may also include returning a probability for each of two or more intent classifications from a second neural network based on detected phrases and time stamps as input features to the second neural network at block 29. For example, the method 20 may include classifying the spoken intent in accordance with a highest probability of the two or more intent classifications at block 30. Some embodiments of the method 20 may further include asynchronously triggering the second neural network when a sequence of detected phrases is ready for classification at block 31.

Embodiments of the method 20 may be implemented in a system, apparatus, computer, device, etc., for example, such as those described herein. More particularly, hardware implementations of the method 20 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 20 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#or the like and conventional procedural programming languages, such as the "C" programming language or similar programming languages.

For example, the method 20 may be implemented on a computer readable medium as described in connection with Examples 15 to 21 below. Embodiments or portions of the method 20 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some other automatic speech recognition (ASR) systems may include a wake-phrase detector, a speech recognizer, and/or a natural language understanding (NLU) module. The wake-phrase detector listens for a wake-up phrase. The speech recognizer starts recognizing the speech signal when the wake-phrase is detected. The recognized word hypotheses are then analyzed by the NLU module. The compute and memory resources for all of these three components are difficult to optimize in a way that they can operate in low power. In general, the accuracy of the three components decreases with decreasing complexity while the power consumption increases with increasing complexity, particularly for the speech recognizer and NLU module. Some ASR systems also generally require an end of utterance detection. Noise robust end of utterance detection may be utilized in some ASR systems, which may significantly increase the power consumption.

Some embodiments may advantageously provide time asynchronous spoken intent detection for low power applications. For example, some embodiments may provide technology that detects speaker intentions in voice queries for applications with low power constraint (e.g., low power intent detection where a full audio transcription is too costly). Some embodiments may also include feature enhancement technology (e.g., as described in more detail below). In some embodiments, the technology focus on the relevant parts of a speech signal to determine the user intention and, in the same time, neglect noisy segments. Some embodiments of a spoken intent detection system may be implemented with low-power and low-complexity technology, which makes the system suitable for always on operation with suitable hardware (e.g., ultra-low power always listening products such as INTEL 7th Generation Processor Family cAVS (Audio, Voice, Speech)—A2E0 chipsets, INTEL GAUSSIAN MIXTURE MODELS AND NEURAL NETWORKS ACCELERATOR (GNA), etc.).

Figure 3:
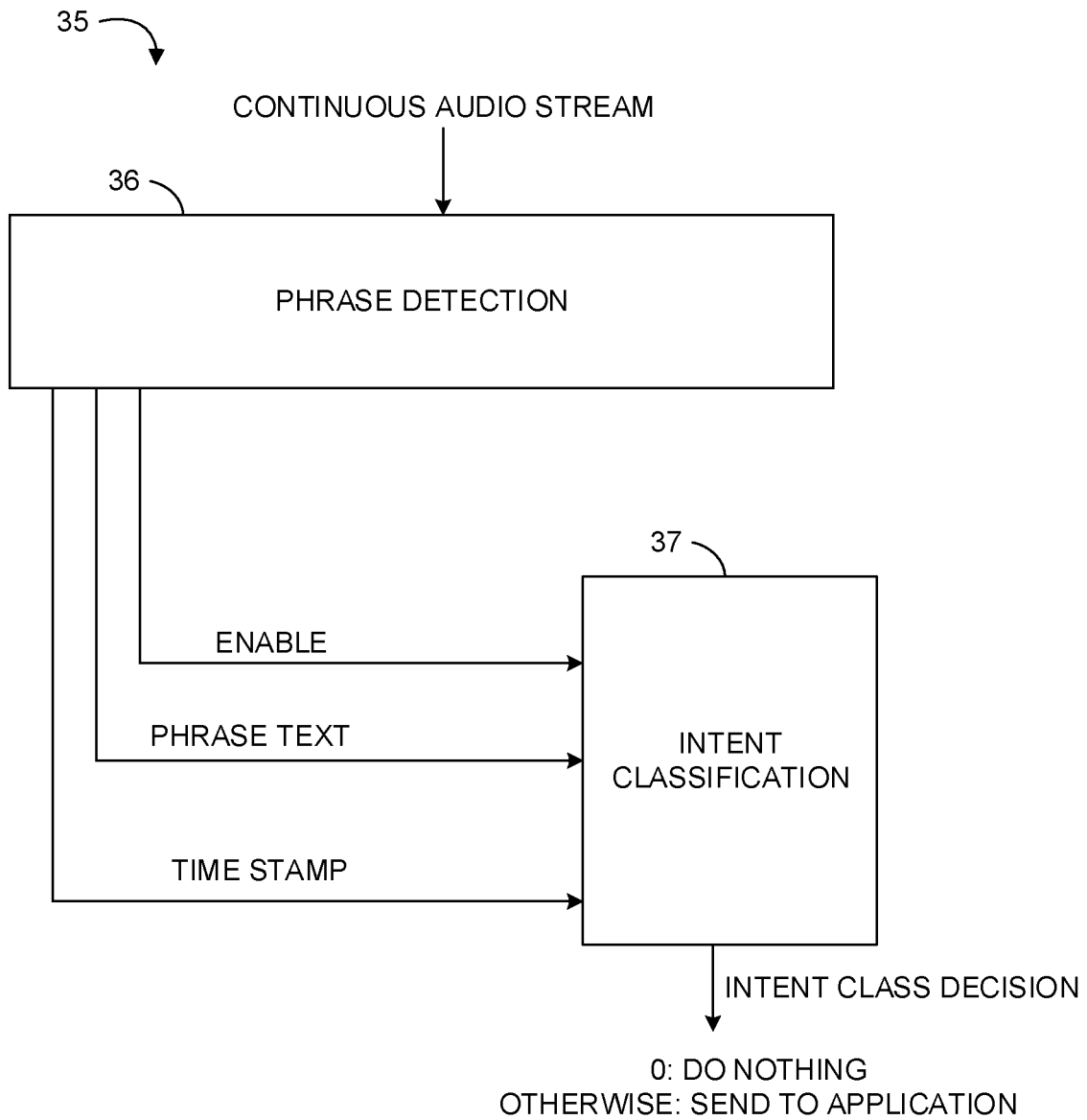
FIG. 3 is a block diagram of an example of a spoken intent detection system according to an embodiment.

With reference to FIG. 3, an embodiment of a spoken intent detection system 35 may include a phrase detection module 36 communicatively coupled to an intent classification module 37. The phrase detection module 36 may incorporate or access a defined in-domain vocabulary (e.g., a pre-defined vocabulary for a particular application or set of applications). For example, a developer may define the in-domain vocabulary, manually or through an automated or semi-automated process. As compared to a full ASR system, an in-domain vocabulary may be limited in scope and may involve fewer words, which advantageously reduces complexity and required compute and memory resources such that low power, stand-alone voice applications may be fully supported. For example, a light control application may include about 150 words in the in-domain vocabulary. In another example, a vehicle climate control application may include about 500 words in the in-domain vocabulary. In situations where sufficient power and/or network bandwidth is available, some embodiments may determine if a detected intent is outside the scope of the in-domain vocabulary and provide the speech signal and/or speech text data to a full ASR system for further processing (e.g., in addition to independent, stand-alone operation, some embodiments of the spoken intent detection system 35 may also operate as a front end to full ASR system).

The phrase detection module 36 may monitor a continuous audio stream, and output an enable signal, phrase text, and time stamp information to the intent classification module 37. For example, the phrase detection module 36 detects the in-domain vocabulary in the continuous audio stream, determines the corresponding phrase text and also determine a relative, quantized time stamps to previously spotted phrases of the continuous audio stream. The sequence of detected phrases and time stamps are features for the intent classification module 37. For example, an acoustic model of the phrase detection module 36 may be utilized to automatically add time stamp information to the text data for intent classification training. In some embodiments, intermediate results may be made available to higher level API functions (e.g., phrase signal information, phrase text information, and/or time stamp information may be made available through an API). For example, the phrase detection module 36 may include a neural network, a machine learning network, or other type of DSP trained with the in-domain vocabulary.

The intent classification module 37 receives the signals from the phrase detection module 36 and outputs an intent class decision. For example, the intent class decision may include a multi-bit binary digital signal where a value of zero (0) indicates 'DO NOTHING' (e.g., corresponding to no intent recognition) while non-zero indicates "SEND TO APPLICATION" (e.g., corresponding to a recognized intent which may be acted on by an application without further processing by a full ASR system). For example, the intent classification module 37 may include a neural network, a machine learning network, or other type of DSP trained with an intent classification model.

Advantageously, some embodiments may enable always-on functionality with low or minimal power consumption. For example, keyword spotting may be executed on an ultra-low power digital signal processor (DSP) and the intent classification may be executed on a low power DSP. The intent classification module 37 (e.g., the low power DSP) may be essentially powered down until it receives an appropriate enable signal from the phrase detection module 36 (e.g., the ultra-low power DSP). Some embodiments may include a wake-phrase in the pre-defined vocabulary, but such a wake-phrase is optional in many applications. Omitting the wake-phrase may provide a more natural user experience. Some embodiments may provide technology which is robust in noisy conditions and may be implemented with companion technology of the audio sub system (e.g., audio integrated circuits (ICs)).

For example, the system 35 may implement one or more aspects of the method 20 (FIGS. 2A to 2C), the system 35 (FIG. 3), the system 40 (FIG. 4A), the process flow 45 (FIG. 4B), the apparatus 50 (FIG. 5A), the model 55 (FIG. 5B), the model 60 (FIG. 6), the apparatus 70 (FIG. 7), the process flow 80 (FIG. 8), or any of the embodiments discussed herein. In some embodiments, the illustrated system 35 may include be implemented as discrete components on a printed circuit board (PCB) substrate, or digital circuitry on one or more semiconductor substrate(s) (e.g., silicon, sapphire, gallium arsenide, a SoC, etc.) with suitable logic (e.g., transistor array and other integrated circuit components) coupled to the substrate(s). The functionality of the system 35 may be implemented at least partly in configurable logic or fixed-functionality logic hardware. In one example, the logic may include transistor channel regions that are positioned (e.g., embedded) within the substrate(s). Thus, the interface between the logic and the substrate(s) may not be an abrupt junction. The logic may also be considered to include an epitaxial layer that is grown on an initial wafer of the substrate(s).

Figure 4A:
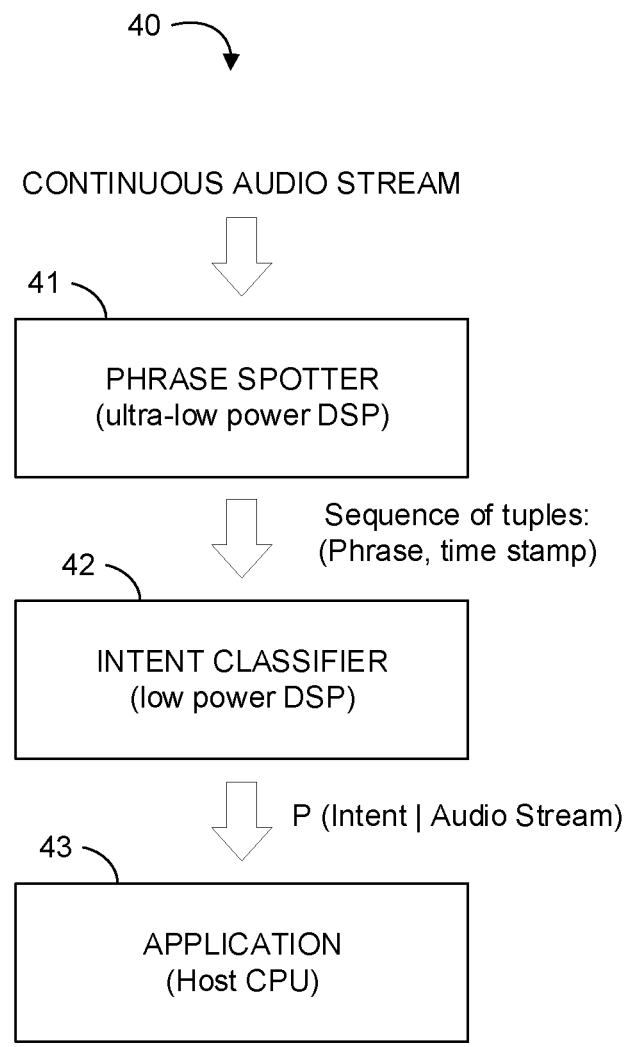
FIG. 4A is a block diagram of an example of another spoken intent detection system according to an embodiment.

With reference to FIG. 4A, an embodiment of an electronic system 40 may include a phrase spotter 41 communicatively coupled to an intent classifier 42, which in turn is communicatively coupled to an application 43. The phrase spotter 41 listens to a continuous audio stream. Whenever a phrase is spotted, the phrase spotter 41 computes a quantized time stamp which is relative to previously spotted keyphrase. The sequence of spotted phrases and time stamps are features for the intent classifier 42. The intent with the highest probability is passed to the application 43 (e.g., to turn on/off lights, to control a music application, etc.). In some embodiments, the high level architecture of the system 40 may be executed on a DSP (e.g., a companion IC of a host system).

Figure 4B:
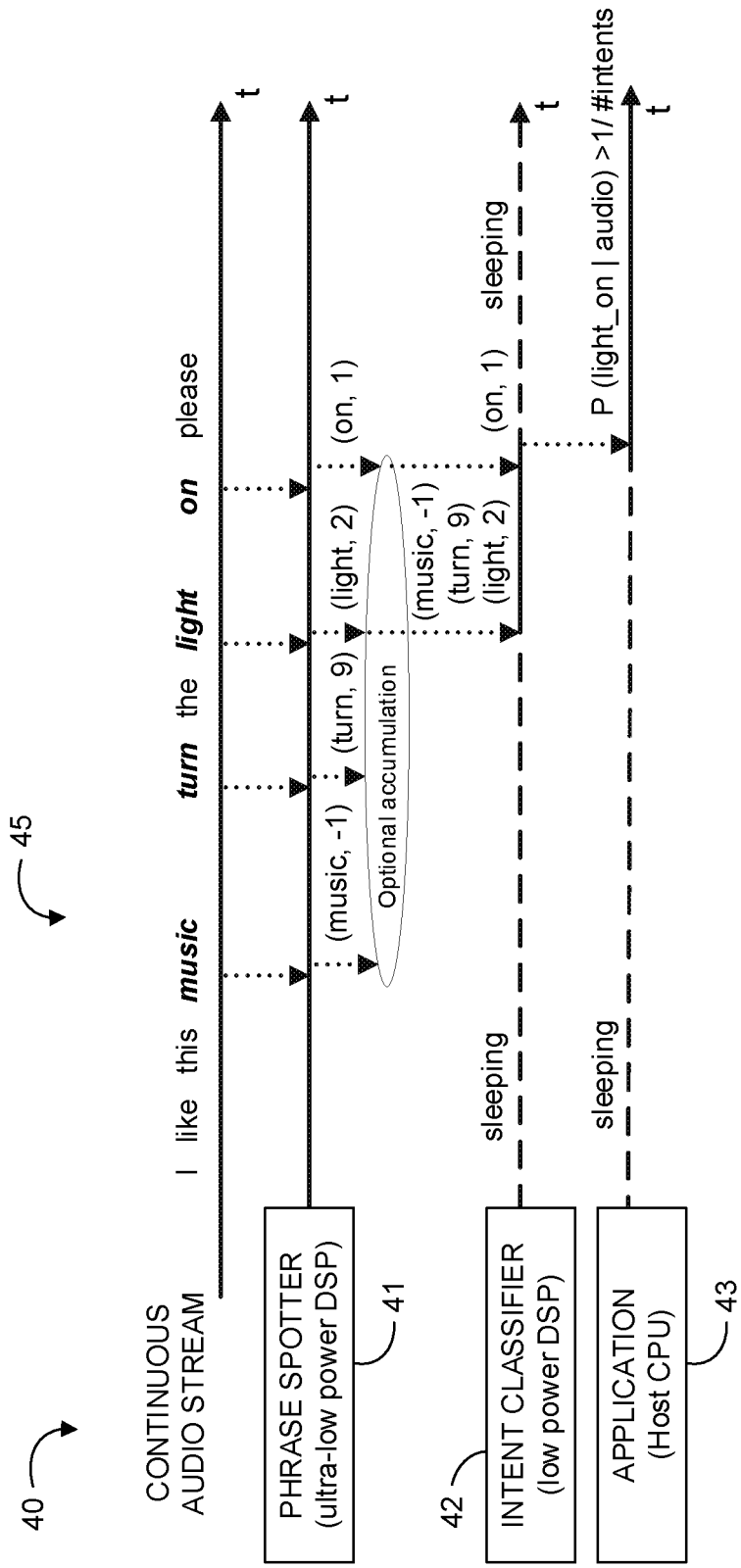
FIG. 4B is an illustrative diagram of an example of a process flow for the spoken intent detection system of FIG. 4A.

With reference to FIG. 4B, an embodiment of an illustrative process flow 45 shows a time sequence of when various components of the system 40 may be active (solid line) or sleeping (dashed line). Advantageously, the intent classifier 42 is asynchronously triggered from the phrase spotter 41, which enables embodiments of the technology to execute the phrase spotter 41 and the intent classifier 42 on DSPs in different operation modes (e.g., ultra-low power DSP mode, and low power DSP mode).

For an application with at least two functionalities including light control and music control, the user might say " . . . I like the music . . . turn the light on please . . . " where the first part ("I like this music") comes out of a conversation. The second part ("turn the light on please") is a user request to the application for light control. The in-domain vocabulary is "light", "music", "on", "turn" etc. (indicated as bold and italicized in FIG. 4B). The spotted phrase is accumulated as long as the frequency gets height. Finally, the accumulated phrases are passed to the intent classifier 42.

Phrase Spotter Examples

Some embodiments may provide technology to use the keywords sequence and timing in a speech utterance to determine the intent of the speaker. Instead of just using the syntactical sequence of spotted keywords for intent classification, some embodiments may use a feature representation which is closer to the speech signal. For example, some embodiments may MFCC enhanced keyword features. Some embodiments may enable a low-power always-on system that focuses the analysis on relevant parts of an utterance.

Advantageously, some embodiments may be applied to the different application domains where an agent is waiting for an instruction from a user in an always-on mode. Running on suitable low power hardware, an implementation may be able to capture the core intent from the user while saving resources on battery power devices. Some embodiments may be particularly useful for artificial intelligence (AI) related fields for human-agent communication and understanding while the environment is a noisy room or inside a car. For example, 'intelligent' meetings, parties, and in-car environments may all benefit from active AI based human-computer interactions and all may further benefit from embodiments of an always-listening low-power intent recognition system.

Some embodiments may provide technology to detect a set of keywords in a sequence with suitable timing and make an intent decision from the detected keywords/sequence by using enhanced features. The number of keywords may depend on each utterance and the timing of the keywords. For example, one to three keywords may be detected within a time period to determine an intent of the speaker to utilize an ASR system. An example of intent determination from three utterances within a suitable time period is shown below:

"increase, 1"+"speed, 3" faster;
"turning, 2"+"way, 5" destination;
"slowing, −1"+"down, 2" slower;
where <keyword_1, time_stamp_1>+<keyword_2, time_stamp_2>==<utterance_intent>.

Figure 5A:
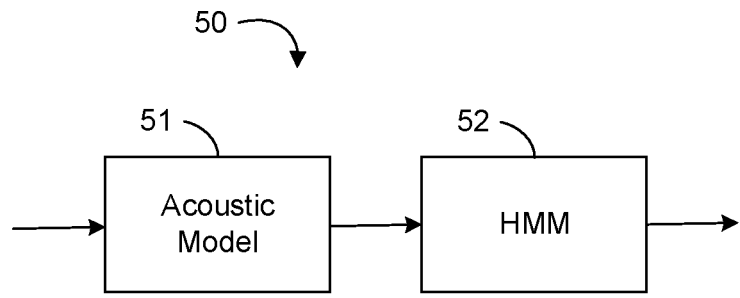
FIG. 5A is a block diagram of an example of a phrase spotter apparatus according to an embodiment.

With reference to FIG. 5A, an embodiment of a phrase spotter apparatus 50 may include an acoustic model 51 communicatively coupled to a HMM 52. For example, the acoustic model 51 inferences a speech signal using a neuronal network, e.g., a feed-forward neural net (NN), a time-delay NN or a recursive NN/long short-term memory (LSTM) network. The result from the acoustic model 51 is passed to the HMM 52 which contains phonetic sequences for each phrase to spot. For example, a Viterbi search may be utilized.

Figure 5B:
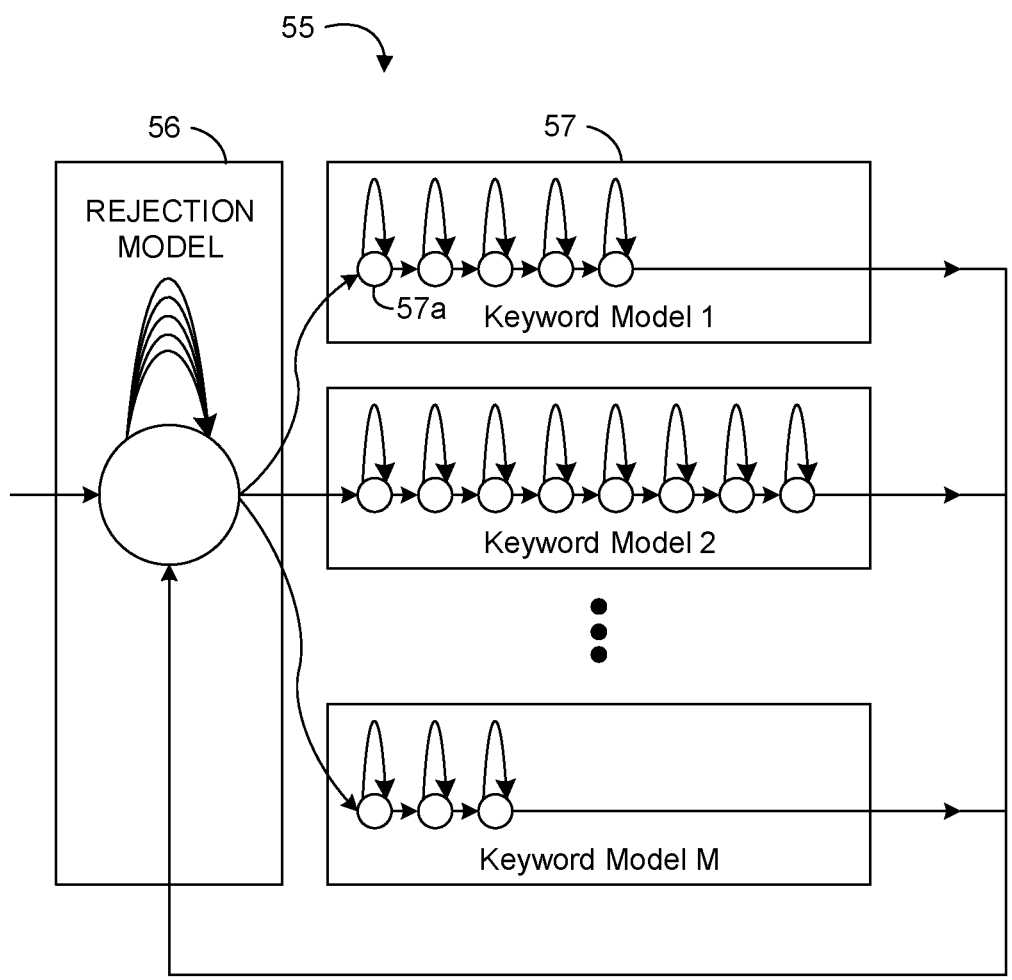
FIG. 5B is an illustrative diagram of an example of a multi-keyword model according to an embodiment.

Turning now to FIG. 5B, an embodiment of a multi-keyword model 55 may include a rejection model 56, and a plurality of keyword models 57 (e.g., keyword model 1 through keyword model M; M>1). The rejection model 56 is logically positioned before the keyword models 57 and handles silence, noises, and non-keyword speech. The keyword models 57 each include one or more sub-phonetic units 57a (e.g., tri-phone states). Although each example keyword model 1 through M is illustrated with various numbers of sub-phonetic states 57a, more or fewer such states may be utilized depending on the keyword. For the phrase INTEL, for example, the phoneme sequence would be IH2 N T EH1 L in ARPABET lexicon notation, the tri-phone sequence would then be eps/IH2/N IH2/N/T N/T/EH1 T/EH1/L EH1/L/eps. Each arch in FIG. 5B may correspond to an output of a time-delay neural network (e.g., a sub-phonetic output).

In some embodiments, a phrase is reported when the score at the final HMM stage of each sequence exceeds a threshold. In addition to the scoring, information about the processed frames is forwarded to the postponed intent classifier. For a sequence length of N (number of states; N>0), for example, $S_0 \ldots S_{N-1}$ may denote states scores. An initial hidden Markov model (HMM) state 0 models the rejection (e.g., state 0 models everything that does not belong to a keyword). The HMM states 1 . . . N−1 form the keyword model. The final score of the keyword model is calculated as $S_{N-1}-S_0$ and expresses the log likelihood that the keyword was spoken. In order to model endpointing, some embodiments add an N-th dummy state for each of the keyword models 57 (not shown). The dummy state models arbitrary speech, noise, and/or silence after the keyword. With the dummy state, some embodiments may precisely estimate (e.g., with an average error of 50 ms) the time-stamp of when the keyword ends.

Figure 6:
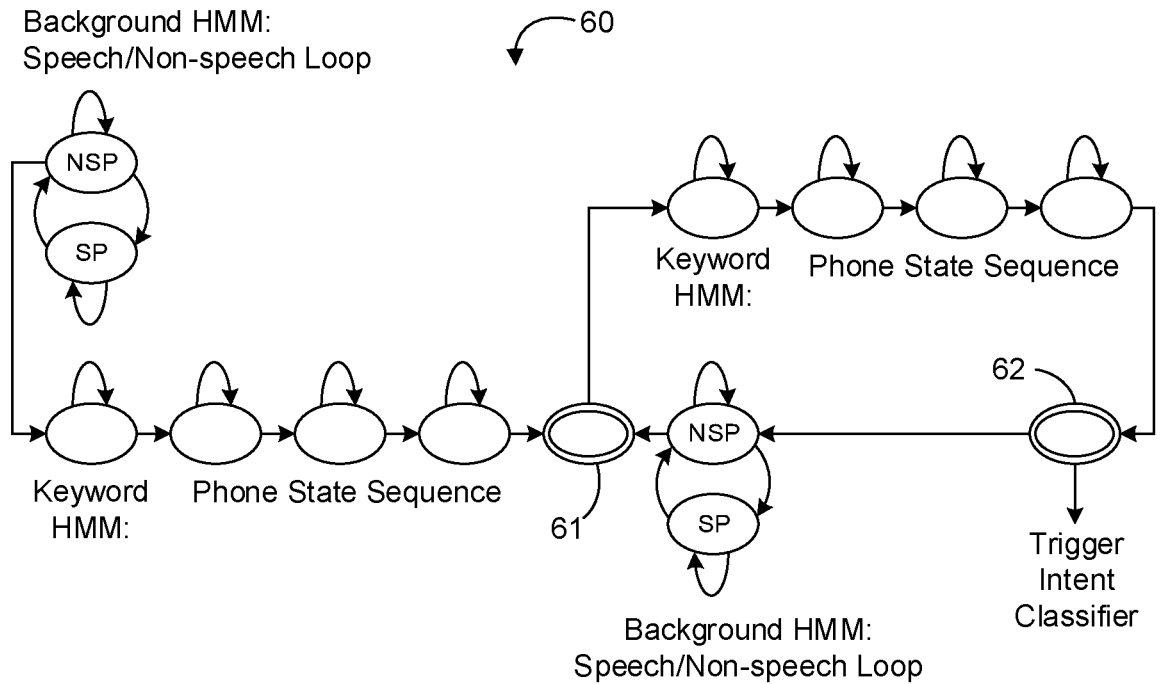
FIG. 6 is a state diagram of an example of a process for keyword detection according to an embodiment.

With reference to FIG. 6, an embodiment of a keyword listening model 60 may be represented as a series of states. The model 60 may start in a background HMM state which loops between speech and non-speech. When a keyword HMM is detected, the model 60 may go to a phone state sequence to detect a keyword. At state 61, a decision may be made whether the keyword is relevant to any recognized intent. If not, the model 60 may go to the background HMM speech/non-speech loop state. If so, the model 60 may wait to detect another keyword HMM followed by a phone state sequence (e.g., although three sub-phonetic units are illustrated, there may be more or fewer in each phone state sequence depending on the keyword). After the next keyword is detected, the model 60 may go to state 62 to make a decision to either trigger the intent classifier (e.g., if the current keyword sequence includes a suitable number of keywords with suitable timing to indicate that the sequence of keywords is ready for intent classification) or to return to the background HMM speech/non-speech loop state to wait for more keywords.

In some embodiments, the features to represent the keywords which occurred in an audio stream may fall into 3 categories including MFCC sequences, phone sequences in distinctive feature vector representations for each phoneme (e.g., see PHOIBLE at https://phoible.org), and word level GLOVE vectors sequence (e.g., see https://nlp.stanford.edu/projects/glove/). Some embodiments may have the keyword set defined for each intent in specific domains. After the keyword detection system detects and segments the keywords from the utterances, some embodiments may then convert the speech words to the corresponding MFCC feature vector sequence, phone level sequence and the word level vectors that represent the detected keyword sequence.

Intent Classifier Examples

Figure 7:
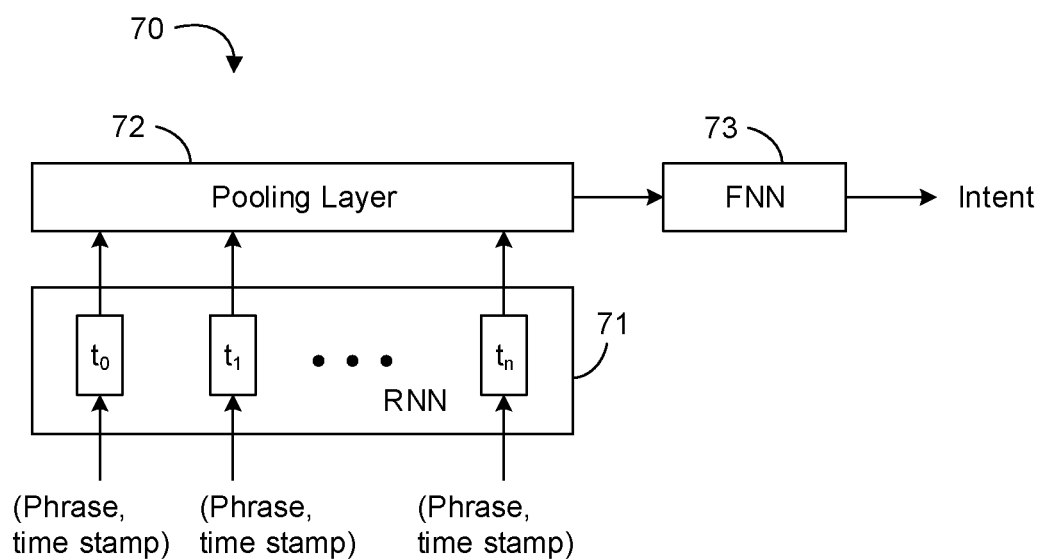
FIG. 7 is an illustrative diagram of an example of an intent classifier apparatus according to an embodiment.

With reference to FIG. 7, an embodiment of an intent classifier apparatus 70 may include a recurrent neuronal network (RNN) 71 communicatively coupled to a pooling layer 72, which in turn is communicatively coupled to a feed forward network (FNN) 73. The intent classifier apparatus 70 takes a sequence of tuples and returns the probability of each intent. A tuple comprises the spotted phrase and a quantized time stamp. A feature front end may be as described above. Some embodiments of the intent classifier apparatus 70 includes a LSTM RNN for the RNN 71 and the finial classification is computed by an (average) pooling layer 72 and the FNN 73. The feature representation format for intent classification may be represented as (Phrase, time stamp).

In some embodiments, LSTM is used as the model for learning and classification of a number of different intent classes. Each input feature stream is passed to one individual LSTM model for intent classification, and the fusion of different systems will give the final intent results. A bagging mechanism is used for obtaining the maximum softmax output score based final decision of the classes.

Some embodiments may provide intent classification based on a sequence of keywords and timing of the keywords in an utterance instead of a single fixed key phrase. In some embodiments, the keyword sequence is transformed into four types of input features including acoustics, phones, WORD2VEC, and SPEECH2VEC for individual intent learning followed by fused decision making. WORD2VEC refers to a group of related models that are used to produce word embeddings. SPEECH2VEC refers to a particular technology for unsupervised learning of word embeddings from speech. After the intent is detected, some embodiments may avoid triggering the more power-costly automatic speech recognition (ASR) technology and provide the detected intent directly to an application which can act on the detected intent, advantageously saving power, compute resources, memory resources, and network bandwidth. As opposed to wake on key-phrase based technology, some embodiments may provide more detailed feature modeling procedures from the word level to the utterance level, which may advantageously provide noise robust intent classification in a variety of environments including, for example, vehicle cabin environments.

Figure 8:
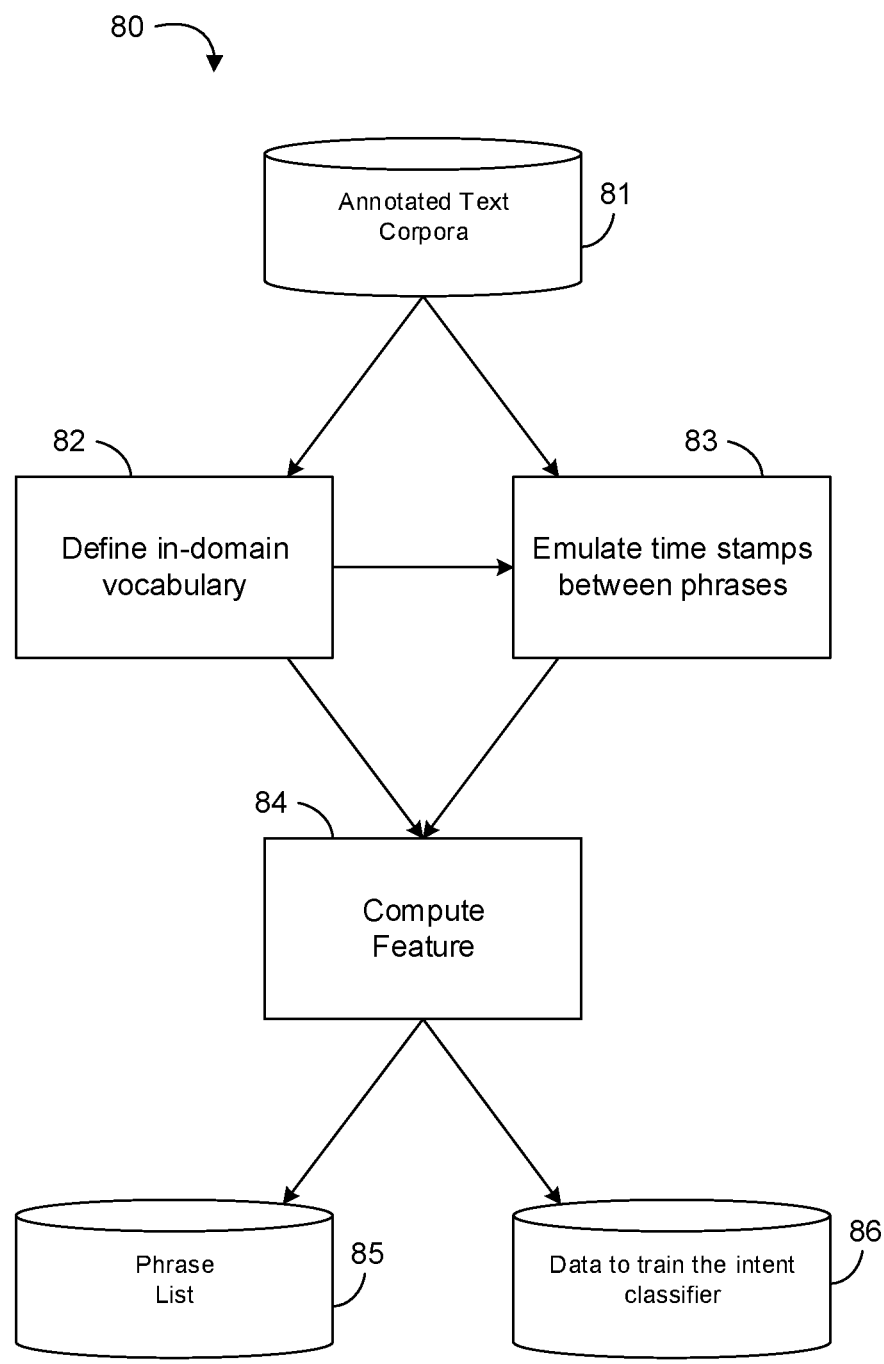
FIG. 8 is an illustrative diagram of an example of training process flow for phrase spotting and intent classification according to an embodiment.

With reference to FIG. 8, an embodiment of a training process flow 80 for both phrase spotting and intent classification starts with an annotated text corpora at block 81 where each sentence is mapped to an intent. The corpus is used to automatically define the in-domain vocabulary and phrases for a target application (e.g., or target set of applications) at block 82. The phrase list from block 82 together with the annotated text corpora at block 81 is used to emulate the time stamps at block 83. Finally, features are computed at block 84 and prepared for training (e.g., with a phrase list at block 85 and data to train the intent classifier at block 86).

Some embodiments advantageously utilize an intent classification model from recognized keywords. In a low power application, using a timed keyword sequence in a continuous is advantageously sufficient and beneficial for utterance level intent recognition. Some embodiments further utilize speech acoustic features together with text input to further improve the intent detection accuracy (e.g., as compared to text only). Embodiments of the described intent recognition framework from detected keywords sets may advantageously be extended in different domains, and may be particularly useful for low-power, always-on applications. Although some embodiments may be utilized as stand-alone spoken intent detection systems, where sufficient power/resources are available some embodiments may be utilized as a front-end to a more fully featured ASR system (e.g., with a larger vocabulary, more application domains, etc.).

Figure 9:
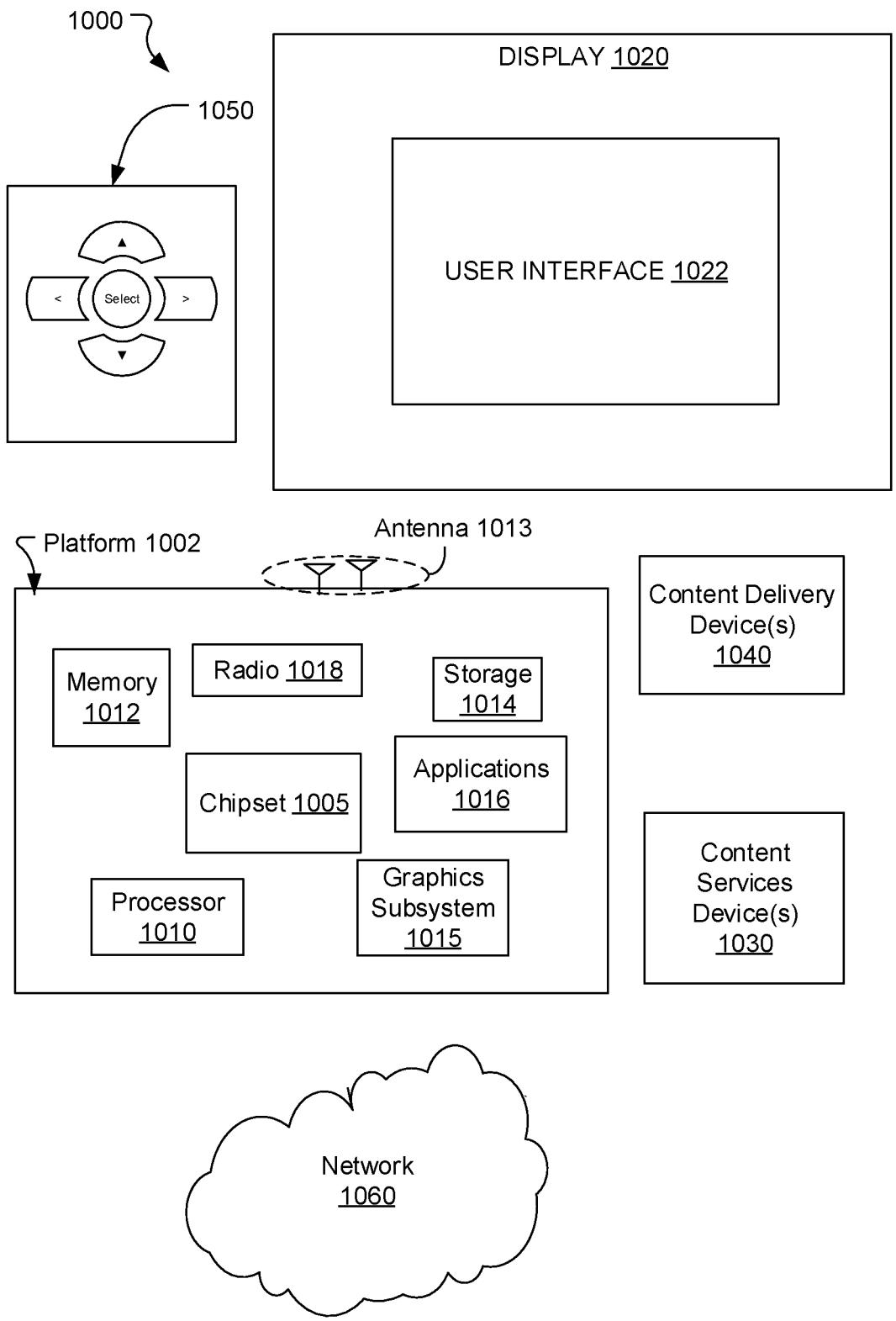
FIG. 9 is an illustrative diagram of an example system.

FIG. 9 is an illustrative diagram of an example system 1000, arranged in accordance with at least some implementations of the present disclosure. In various implementations, system 1000 may be a mobile system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/or display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of may be used to interact with user interface 1022, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 1020) by movements of a pointer, cursor, focus ring, or other visual indicators displayed on the display. For example, under the control of software applications 1016, the navigation features located on navigation may be mapped to virtual navigation features displayed on user interface 1022, for example. In various embodiments, may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off" In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
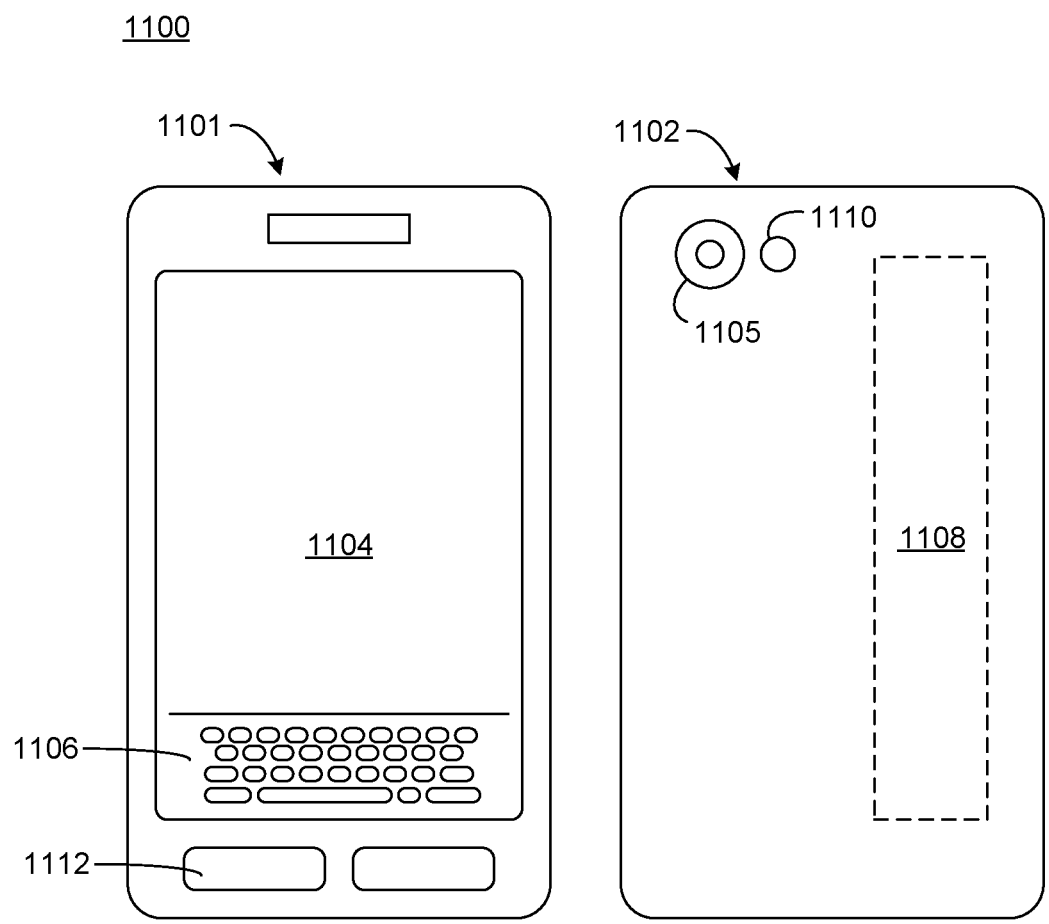
FIG. 10 illustrates an example small form factor device, all arranged in accordance with at least some implementations of the present disclosure.

As described above, system 1000 may be embodied in varying physical styles or form factors. FIG. 10 illustrates an example small form factor device 1100, arranged in accordance with at least some implementations of the present disclosure. In some examples, system 1000 may be implemented via device 1100. In other examples, system 100 or portions thereof may be implemented via device 1100. In various embodiments, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, device 1100 may include a housing with a front 1101 and a back 1102. Device 1100 includes a display 1104, an input/output (I/O) device 1106, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include a camera 1105 (e.g., including a lens, an aperture, and an imaging sensor) and a flash 1110 integrated into back 1102 (or elsewhere) of device 1100. In other examples, camera 1105 and flash 1110 may be integrated into front 1101 of device 1100 or both front and back cameras may be provided. Camera 1105 and flash 1110 may be components of a camera module to originate image data processed into streaming video that is output to display 1104 and/or communicated remotely from device 1100 via antenna 1108 for example.

The system 1000 and/or the device 1100 may include one or more features or aspects of the various embodiments described herein, including those described in the following examples.

ADDITIONAL NOTES AND EXAMPLES

Example 1 includes an electronic system, comprising memory to store an electronic representation of an audio stream, a processor coupled to the memory, and logic coupled to the processor and the memory, the logic to detect a phrase in the audio stream based on a pre-defined vocabulary, associate a time stamp with the detected phrase, and classify a spoken intent based on a sequence of detected phrases and the respective associated time stamps.

Example 2 includes the system of Example 1, wherein the logic is further to monitor a continuous audio stream, detect the phrase in the continuous audio stream, and compute a quantized time stamp for the detected phrase which is relative to previously detected phrase.

Example 3 includes the system of any of Examples 1 to 2, wherein the logic comprises a first neural network with an acoustic model and a hidden Markov model to detect the phrase in the audio stream.

Example 4 includes the system of Example 3, wherein the acoustic model is further configured to automatically add time stamp information to text data for the detected phrase.

Example 5 includes the system of any of Examples 1 to 4, wherein the logic comprises a second neural network trained to return a probability for each of two or more intent classifications based on detected phrases and time stamps as input features to the second neural network.

Example 6 includes the system of Example 5, wherein the logic is further to classify the spoken intent in accordance with a highest probability of the two or more intent classifications.

Example 7 includes the system of Example 5, wherein the logic is further to asynchronously trigger the second neural network when a sequence of detected phrases is ready for classification.

Example 8 includes a method of detecting spoken intent, comprising detecting a phrase in an electronic representation of an audio stream based on a pre-defined vocabulary, associating a time stamp with the detected phrase, and classifying a spoken intent based on a sequence of detected phrases and the respective associated time stamps.

Example 9 includes the method of Example 8, further comprising monitoring a continuous audio stream, detecting the phrase in an electronic representation of the continuous audio stream, and computing a quantized time stamp for the detected phrase which is relative to previously detected phrase.

Example 10 includes the method of any of Examples 8 to 9, further comprising detecting the phrase in the audio stream with a first neural network which includes an acoustic model and a hidden Markov model.

Example 11 includes the method of Example 10, further comprising automatically adding time stamp information to text data for the detected phrase by the acoustic model.

Example 12 includes the method of any of Examples 8 to 11, further comprising returning a probability for each of two or more intent classifications from a second neural network based on detected phrases and time stamps as input features to the second neural network.

Example 13 includes the method of Example 12, further comprising classifying the spoken intent in accordance with a highest probability of the two or more intent classifications.

Example 14 includes the method of Example 12, further comprising asynchronously triggering the second neural network when a sequence of detected phrases is ready for classification.

Example 15 includes at least one machine readable medium comprising a plurality of instructions that, in response to being executed on a computing device, cause the computing device to detect a phrase in an electronic representation of an audio stream based on a pre-defined vocabulary, associate a time stamp with the detected phrase, and classify a spoken intent based on a sequence of detected phrases and the respective associated time stamps.

Example 16 includes the machine readable medium of Example 15, comprising a plurality of further instructions that, in response to being executed on the computing device, cause the computing device to monitor a continuous audio stream, detect the phrase in an electronic representation of the continuous audio stream, and compute a quantized time stamp for the detected phrase which is relative to previously detected phrase.

Example 17 includes the machine readable medium of any of Examples 15 to 16, comprising a plurality of further instructions that, in response to being executed on the computing device, cause the computing device to detect the phrase in the audio stream with a first neural network which includes an acoustic model and a hidden Markov model.

Example 18 includes the machine readable medium of Example 17, comprising a plurality of further instructions that, in response to being executed on the computing device, cause the computing device to automatically add time stamp information to text data for the detected phrase by the acoustic model.

Example 19 includes the machine readable medium of any of Examples 15 to 18, comprising a plurality of further instructions that, in response to being executed on the computing device, cause the computing device to return a probability for each of two or more intent classifications from a second neural network based on detected phrases and time stamps as input features to the second neural network.

Example 20 includes the machine readable medium of Example 19, comprising a plurality of further instructions that, in response to being executed on the computing device, cause the computing device to classify the spoken intent in accordance with a highest probability of the two or more intent classifications.

Example 21 includes the machine readable medium of Example 19, comprising a plurality of further instructions that, in response to being executed on the computing device, cause the computing device to asynchronously trigger the second neural network when a sequence of detected phrases is ready for classification.

Example 22 includes a spoken intent detection apparatus, comprising a substrate, and logic coupled to the substrate, the logic to detect a phrase in an electronic representation of an audio stream based on a pre-defined vocabulary, associate a time stamp with the detected phrase, and classify a spoken intent based on a sequence of detected phrases and the respective associated time stamps.

Example 23 includes the apparatus of Example 22, wherein the logic is further to monitor a continuous audio stream, detect the phrase in an electronic representation of the continuous audio stream, and compute a quantized time stamp for the detected phrase which is relative to previously detected phrase.

Example 24 includes the apparatus of any of Examples 22 to 23, wherein the logic comprises a first neural network with an acoustic model and a hidden Markov model to detect the phrase in the audio stream.

Example 25 includes the apparatus of Example 24, wherein the acoustic model is further configured to automatically add time stamp information to text data for the detected phrase.

Example 26 includes the apparatus of any of Examples 22 to 25, wherein the logic comprises a second neural network trained to return a probability for each of two or more intent classifications based on detected phrases and time stamps as input features to the second neural network.

Example 27 includes the apparatus of Example 26, wherein the logic is further to classify the spoken intent in accordance with a highest probability of the two or more intent classifications.

Example 28 includes the apparatus of Example 26, wherein the logic is further to asynchronously trigger the second neural network when a sequence of detected phrases is ready for classification.

Example 29 includes a spoken intent detection apparatus, comprising means for detecting a phrase in an electronic representation of an audio stream based on a pre-defined vocabulary, means for associating a time stamp with the detected phrase, and means for classifying a spoken intent based on a sequence of detected phrases and the respective associated time stamps.

Example 30 includes the apparatus of Example 29, further comprising means for monitoring a continuous audio stream, means for detecting the phrase in an electronic representation of the continuous audio stream, and means for computing a quantized time stamp for the detected phrase which is relative to previously detected phrase.

Example 31 includes the apparatus of any of Examples 29 to 30, further comprising means for detecting the phrase in the audio stream with a first neural network which includes an acoustic model and a hidden Markov model.

Example 32 includes the apparatus of Example 31, further comprising means for automatically adding time stamp information to text data for the detected phrase by the acoustic model.

Example 33 includes the apparatus of any of Examples 29 to 32, further comprising means for returning a probability for each of two or more intent classifications from a second neural network based on detected phrases and time stamps as input features to the second neural network.

Example 34 includes the apparatus of Example 33, further comprising means for classifying the spoken intent in accordance with a highest probability of the two or more intent classifications.

Example 35 includes the apparatus of Example 33, further comprising means for asynchronously triggering the second neural network when a sequence of detected phrases is ready for classification.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An electronic system, comprising:
an electronic memory to store an electronic representation of an audio stream;
an electronic processor coupled to the memory; and
logic circuitry coupled to the electronic processor and the electronic memory, the logic circuitry to:
electronically detect a phrase in the stored electronic representation of the audio stream based on a pre-defined vocabulary,
electronically compute a time stamp for the detected phrase which is relative to an adjacent previously detected phrase,
electronically associate the time stamp with the detected phrase, and
electronically classify a spoken intent based on a sequence of detected phrases and the respective associated time stamps.

2. The system of claim 1, wherein the logic circuitry is further to:
electronically monitor a continuous audio stream; and
electronically detect the phrase in the continuous audio stream.

3. The system of claim 1, wherein the logic circuitry comprises:
an always-on phrase spotter circuit with a first neural network with an acoustic model and a hidden Markov model to detect the phrase in the audio stream; and
a selectively powered intent classification circuit coupled to the always-on phrase spotter circuit, wherein the selectively powered intent classification circuit is to power up in response to a signal from the always-on phrase spotter circuit to electronically classify the spoken intent.

4. The system of claim 3, wherein the acoustic model is further configured to:
automatically add time stamp information to text data for the detected phrase.

5. The system of claim 3, wherein the selectively powered intent classification circuit comprises:
a second neural network trained to return a probability for each of two or more intent classifications based on detected phrases and time stamps respectively associated with the detected phrases as input features to the second neural network.

6. The system of claim 5, wherein the logic circuitry is further to:
classify the spoken intent in accordance with a highest probability of the two or more intent classifications.

7. The system of claim 5, wherein the always-on phrase spotter circuit is further to:
asynchronously signal the intent classification circuit to power up and trigger the second neural network when a sequence of detected phrases is ready for classification.

8. A method of detecting spoken intent, comprising:
electronically detecting a phrase in an electronic representation of an audio stream based on a pre-defined vocabulary;
electronically associating a time stamp with the detected phrase which is relative to an adjacent previously detected phrase; and
electronically classifying a spoken intent based on a sequence of detected phrases and the respective associated time stamps.

9. The method of claim 8, further comprising:
electronically monitoring a continuous audio stream;
electronically detecting the phrase in an electronic representation of the continuous audio stream; and
electronically computing the time stamp for the detected phrase which is relative to the adjacent previously detected phrase.

10. The method of claim 8, further comprising:
detecting the phrase in the audio stream with a first neural network which includes both an acoustic model and a hidden Markov model.

11. The method of claim 10, further comprising:
automatically adding time stamp information to text data for the detected phrase by the acoustic model.

12. The method of claim 8, further comprising:
returning a probability for each of two or more intent classifications from a second neural network based on detected phrases and time stamps respectively associated with the detected phrases as input features to the second neural network.

13. The method of claim 12, further comprising:
classifying the spoken intent in accordance with a highest probability of the two or more intent classifications.

14. The method of claim 12, further comprising:
asynchronously triggering the second neural network when a sequence of detected phrases is ready for classification.

15. At least one non-transitory machine readable medium comprising a plurality of instructions that, in response to being executed on a computing device, cause the computing device to:
electronically detect a phrase in an electronic representation of an audio stream based on a pre-defined vocabulary;
electronically compute a time stamp for the detected phrase which is relative to an adjacent previously detected phrase;
electronically associate the time stamp with the detected phrase; and
electronically classify a spoken intent based on a sequence of detected phrases and the respective associated time stamps.

16. The machine readable medium of claim 15, comprising a plurality of further instructions that, in response to being executed on the computing device, cause the computing device to:
electronically monitor a continuous audio stream; and
electronically detect the phrase in an electronic representation of the continuous audio stream.

17. The machine readable medium of claim 15, comprising a plurality of further instructions that, in response to being executed on the computing device, cause the computing device to:
detect the phrase in the audio stream with a first neural network which includes both an acoustic model and a hidden Markov model.

18. The machine readable medium of claim 17, comprising a plurality of further instructions that, in response to being executed on the computing device, cause the computing device to:
automatically add time stamp information to text data for the detected phrase by the acoustic model.

19. The machine readable medium of claim 15, comprising a plurality of further instructions that, in response to being executed on the computing device, cause the computing device to:
   return a probability for each of two or more intent classifications from a second neural network based on detected phrases and time stamps respectively associated with the detected phrases as input features to the second neural network.

20. The machine readable medium of claim 19, comprising a plurality of further instructions that, in response to being executed on the computing device, cause the computing device to:
   classify the spoken intent in accordance with a highest probability of the two or more intent classifications.

21. The machine readable medium of claim 19, comprising a plurality of further instructions that, in response to being executed on the computing device, cause the computing device to:
   asynchronously trigger the second neural network when a sequence of detected phrases is ready for classification.

\* \* \* \* \*